United States Patent [19]

Butler et al.

[11] 4,160,250
[45] Jul. 3, 1979

[54] ACTIVE RADAR MISSILE LAUNCH ENVELOPE COMPUTATION SYSTEM

[75] Inventors: Walker Butler; Randolph G. Moore, Scottsdale, Ariz.

[73] Assignee: Motorola, Inc., Schaumburg, Ill.

[21] Appl. No.: 844,254

[22] Filed: Oct. 21, 1977

Related U.S. Application Data

[63] Continuation-in-part of Ser. No. 734,585, Oct. 21, 1976, abandoned.

[51] Int. Cl.² .................................................. G01S 9/04
[52] U.S. Cl. ...................................................... 343/9 R
[58] Field of Search ............................................. 343/9

[56] References Cited

U.S. PATENT DOCUMENTS 3,733,604  5/1973  Smith .................................. 343/9 X
3,821,738  6/1974  Quesinberry et al. ............... 343/9 X Primary Examiner—T. H. Tubbesing
Attorney, Agent, or Firm—Eugene A. Parsons

[57] ABSTRACT

A launch envelope computation system adapted to be mounted on a missile including a radar for providing signals indicative of range, range rate, target angle and target angle rate of change, a memory for storing a maximum and minimum missile envelope, a computer connected to receive signals from the radar and additional signals from a launch vehicle including velocity and altitude, for updating the missile envelopes, and a computer connected to the memory means and the radar for determining whether a target is within the missile envelope and providing launch or no launch signals, as well as indication of what altitude changes, if any, are required in the launch vehicle to allow a launch.

6 Claims, 5 Drawing Figures

ACTIVE RADAR MISSILE LAUNCH ENVELOPE COMPUTATION SYSTEM

RELATED APPLICATIONS

This application is a continuation-in-part of the copending patent application, now abandoned Ser. No. 734,585, filed Oct. 21, 1976, and bearing the same title.

BACKGROUND OF THE INVENTION

The present invention is especially useful in tactical type missiles or intercept systems, such as air-to-air missiles and the like. The major problem that occurs in these missiles or systems is the launching of missiles when it is impossible for the missile to intercept the designated target because of the targets orientation, speed, distance, etc. In some prior art systems the launch vehicle has an airborne intercept type radar with associated computer mounted thereon which can determine some of the required parameters so that the number of missiles launched with no chance of intercepting the target is greatly reduced. However, many airborne and surface launch vehicles do not have the computer or even the radar, so a simplified launch envelope computation system in the missile is desirable.

SUMMARY OF THE INVENTION

The present invention pertains to an active radar missile launch envelope computation system adapted to be mounted on a missile for control thereof and including a radar for providing signals indicative of the range, rate of change of the range, angular position of the target and rate of change of the angular position of the target, a memory having stored therein maximum and minimum launch envelopes indicative of the maximum capabilities of the missile for all target aspects, an envelope computer connected to the radar and the memory means for updating the maximum and minimum envelopes in accordance with variations in conditional parameters, such as altitude and velocity of the launch vehicle, and a computer connected to the radar and the memory for determining whether the target is incoming or outgoing and whether it is positioned within the minimum or maximum envelopes, respectively, at the time of launch with the launch computer controlling launch and providing launch or no launch (ready or out-of-envelope) signals at the output thereof.

It is an object of the present invention to provide an active radar missile launch envelope computation system adapted to be mounted on a missile for control thereof.

It is a further object of the present inventon to provide a missile launch envelope computation system wherein a radar is carried aboard the missile and continuously supplies to computer means and memory means signals indicative of the range to a target, the rate of change of the range, the angular position of the target and the rate of change of the angular position, so that the computer means, with the aid of the memory means, can determine whether the chosen target is within a maximum or minimum envelope of the missile.

These and other objects of this invention will become apparent to those skilled in the art upon consideration of the accompanying specifications, claims and drawings.

BRIEF DESCRIPTION OF THE DRAWINGS

Referring to the drawings.

DESCRIPTION OF THE PREFERRED EMBODIMENT

Figure 1:
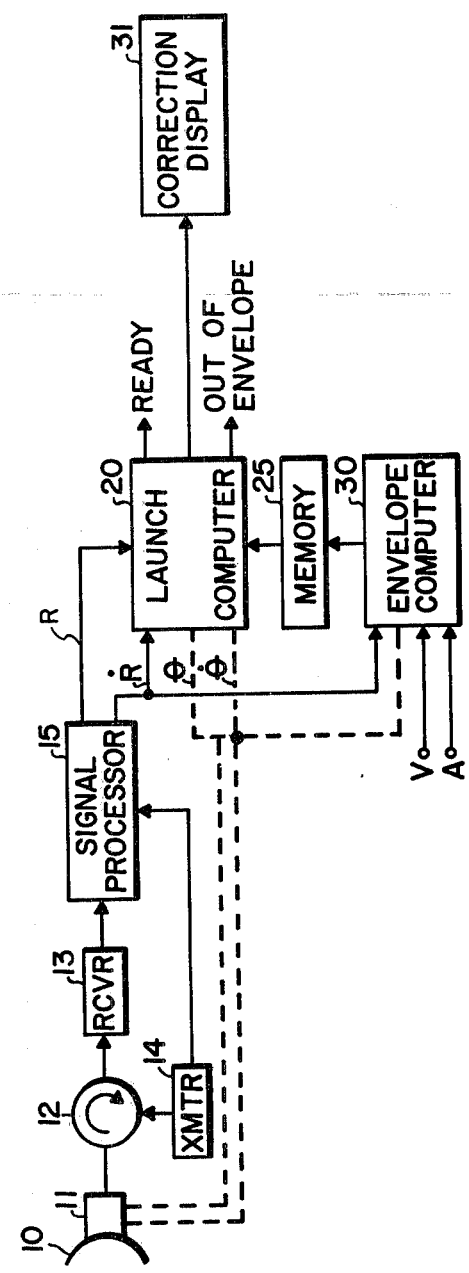
FIG. 1 is a block diagram of an active radar missile launch envelope computation system embodying the present invention.

Referring specifically to FIG. 1, the numeral 10 designates an antenna for a radar to be mounted aboard a missile and the antenna 10 is mounted by means of a mechanical control box 11, which box 11 provides output signals indicative of the angular position of the target relative to a predetermined axis or fixed direction ($\theta$) and the rate of change of the angular position ($\dot{\theta}$). The antenna 10 is electrically connected through a circulator 12 to receiver 13 and a transmitter 14. The output of the receiver 13 is connected to a signal processor 15 and timing signals from the transmitter 14 are also connected to the signal processor 15. The signal processor 15 provides output signals indicative of the range (R) and rate of change of the range ($\dot{R}$). The range and range rate signals from the signal processor 15 are applied to a launch computer 20 along with the angular position and rate of change of the angular position signals from the antenna mounting apparatus 11 (indicated by dotted lines). The launch computer 20 also receives an input from a memory 25 and supplies output signals indicative of a launch or ready condition and a no launch or out-of-envelope condition. An envelope computer 30 also receives the signals indicative of the rate of change of the range and the rate of change of the angular position. The envelope computer 30 may also receive signals indicative of the velocity of the launching craft (V) and the altitude of the launching craft (A) if the missile is launched from a moving or airborne vehicle, such as when utilizing the present computation system in an air-to-air missile. The output of the envelope computer 30 is applied to the memory 25.

Figure 2:
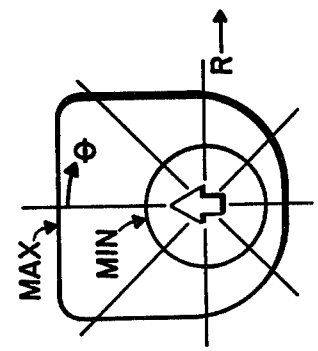
FIG. 2 is a polargraphic representation of maximum and minimum envelopes for a missile.

In the operation of the present system, the maximum and minimum envelopes are determined from the various parameters, including speed, turning rate, maximum range, etc., of the missile on which the system is mounted. The maximum envelope of the missile is the maximum boundry within which the missile can seek and intercept a target which is going away from the missile. The minimum envelope is the boundary outside of which the missile can seek and intercept a target coming toward the missile. A great number of conditional parameters, including altitude, velocity of the launch vehicle, range rate, maneuvers or change of position of the target, etc. will affect the envelopes. The degree of complexity in calculating the envelopes from the conditional parameters and including all of the conditional parameters which affect the envelopes can be extensive or can be simplified, depending upon the requirements of the missile. In the simplest form, a plurality of maximum and minimum envelopes are stored in the memory 25, each envelope representing different sets of conditions. The envelope nearest the prevailing set of conditions is then selected by the memory 25 and supplied to the launch computer 20. If a more exact system is required, one maximum and minimum envelope is stored in the memory 25 and the envelopes are continuously recomputed by the use of algorithms in the envelope computer 30 and the input information thereto. While only the altitude, velocity of the launch vehicle, angular rate and range rate are applied to the envelope computer 30, it should be understood that variations in other conditional parameters could also be included if desired. Also, in the present embodiment the altitude and velocity of the launch vehicle are obtained from the launch vehicle but other sources, including apparatus mounted directly onto the missile, might be utilized if desired. Typical maximum and minimum envelopes are illustrated in FIG. 2 in a polargraph type of representation.

Through the use of the range rate and angular rate, the launch computer 20 calculates whether the target is coming toward the missile or traveling away from the missile, and thereby, selects the maximum or minimum envelope. With the correct envelope supplied to the launch computer 20 by the memory 25, the launch computer 20 utilizes the range and angular position of the target relative to the predetermined axis to calculate whether the target is within the envelope. Referring to FIG. 2, it should be noted that the target must appear inside of the maximum envelope if the target is traveling away from the missile and it must appear outside of the minimum envelope if it is traveling toward the missile to come within the capabilities of the missile. If the launch computer 20 determines that the target is within the capabilities of the missile, within the stored envelope, a signal appears at the ready output of the launch computer 20. If the target is not within the capabilities of the missile a signal appears at the out-of-envelope output of the launch computer 20. If the computer determines that there is one key factor, controllable by the launch vehicle, such as look angle, which has placed a target outside of the launch envelope, the computer 20 will provide an output which will indicate to the operator the action which must be taken to bring the target into envelope. A correction display 31 is connected to the computer 20 to receive signals therefrom and provide a visual indication of such referred corrections.

The memory 25 can be any memory commercially available and the launch and envelope computers 20 and 30 can be special purpose circuits or microprocessors such as the microprocessor sold commercially under the Motorola part number M5800.

Figure 3:
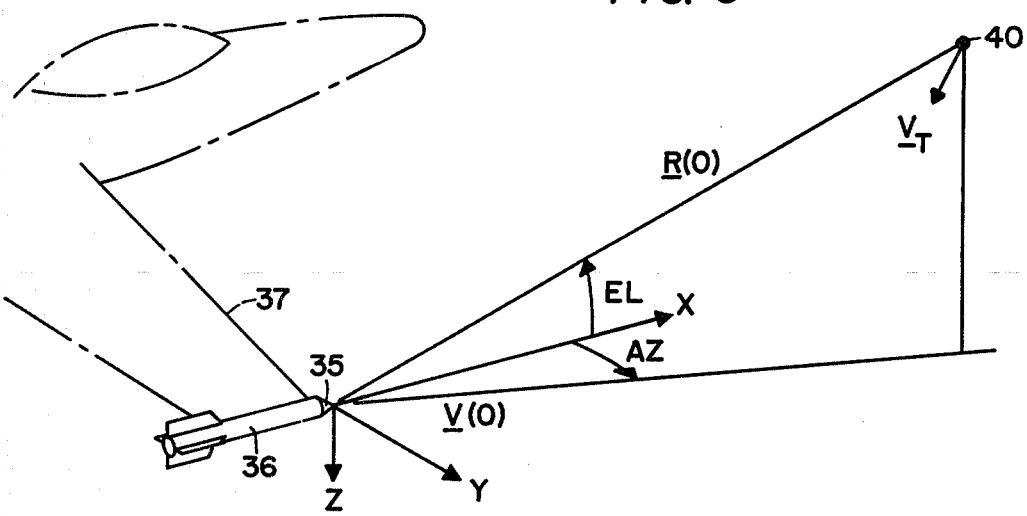
FIG. 3 is a vector diagram illustrating the prelaunch geometry for the missile.

More specifically, the concept of the present system or seeker is as follows: Referring to FIG. 3, the system or seeker, designated 35 and forming the nose of a missile 36 mounted on an airplane 37, tracks a target 40 prior to launch. The system measures the azimuth and elevation (generally designated $\theta$ in FIG. 1), range (R) and range rate ($\dot{R}$) of the target relative to the system and uses these quantities to compute whether or not, if the missile were launched at any instant of time, it would achieve an acceptable miss distance i.e. whether the missile/target geometry is such that an acceptable miss distance is within the dynamic capabilities of the missile and system. The computation is performed in the system by the high speed launch computer 20. The differential equations of motion of the missile 36 and target 40 are solved numerically in the computer 20 using the above mentioned measured quantities as initial conditions to determine whether an acceptable miss distance can be obtained. The solutions of the differential equations are performed periodically at a sufficiently high rate such that the time lag in obtaining these solutions is insignificant in determining whether or not to launch the missile 36.

Referring to the geometry of FIG. 3, the system continuously measures the following variables prior to launch.

R = range from system 35 to target 40
$\dot{R}$ = range rate of target 40 relative to system 35
AZ = azimuth angle of target 40 relative to system 35
EL = elevation angle of target 40 relative to system 35
$\dot{AZ}$ = azimuth rate of target 40 relative to system 35
$\dot{EL}$ = elevation rate of target 40 relative to system 35

As an approximation, it is assumed that the launch aircraft 37 and target 40 are non-maneuvering. Also, since the system 35 does not measure the velocity of the missile 36, the velocity of the aircraft 37, and thus missile velocity at launch, is approximated by a prestored nominal value, which input is applied to the terminal V illustrated in FIG. 1. The position and velocity of the target 40 in the x-y-z coordinate system shown in FIG. 3 are computed in the system computer 20 using the following equations.

$$P_T(o) = \begin{bmatrix} R\cos EL \cos AZ \\ R\cos EL \sin AZ \\ -R\sin EL \end{bmatrix} \quad (1)$$

$$V_T = \begin{bmatrix} \frac{x}{R}\dot{R} + Z(\cos AZ)\dot{EL} - y\dot{AZ} + V_A \\ \frac{y}{R}\dot{R} + Z(\sin AZ)\dot{EL} + x\dot{AZ} \\ \frac{z}{R}\dot{R} - R(\cos EL)\dot{EL} \end{bmatrix} \quad (2)$$

$V_A$ = assumed missile velocity at launch aircraft velocity at launch
$P_T$ = position vector of target relative to x-y-z coordinate system
$V_T$ = velocity vector of target relative to x-y-z coordinate system.

The x-y-z coordinate system is fixed in inertial space with the origin in the system 35 at any instant of time. The x, y and z axes are coincident with the longitude, azimuth and elevation axes of the system 35, respectively. The vector $P_T$ (o) is used as the initial target position and the vector $\underline{V}_T$ is used as the constant target velocity in solving the differential equations of the flight trajectories.

Figure 4:
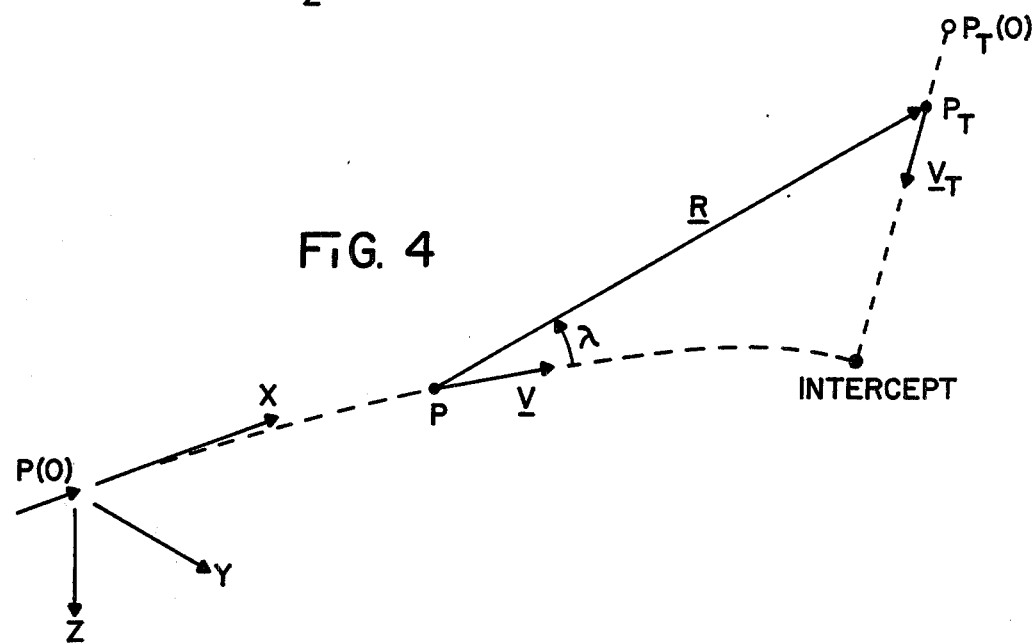
FIG. 4 is a vector diagram illustrating the flight geometry for the missile.

The geometry of a homing missile flight is shown in FIG. 4, which geometry is equally applicable to the present missile 36. In FIG. 4, the missile 36 starts from the origin of the x-y-z coordinate system and the target 40 starts at position $P_T$(o) with velocity $\underline{V}_T$. Assuming that the homing guidance law is proportional navigation, the vector differential equations of missile and target motion are as follows:

Kinematic Equations $$A_G = A_{TH} \frac{V}{|V|} \quad (3)$$

$$\frac{d^2P}{dt^2} = A = A_N + A_G \quad (4)$$

$$\frac{dp}{dt} = V \quad (5)$$

-continued $$P_T = P_T(o) + V_T t \qquad (6)$$

$$R = P_T - P \qquad (7)$$

$$W_R = \frac{R \times (V_T - V)}{|R|^2} \qquad (8)$$

Guidance Law Equations $$W = N W_R \qquad (9)$$

$$A_{NC} = W \times V = N W_R \times V \qquad (10)$$

$A_N = A_{NC}$ limited in amplitude to $A_L$ with the direction of $A_{NC}$ $A_L$ = acceleration limit of the missile The symbols used in these equations are defined as follows:

$\underline{A}_G$ = missile tangential acceleration vector
$\underline{A}_N$ = missile normal acceleration vector
$\underline{A} = \underline{A}_G + \underline{A}_N$ = missile acceleration vector
$\underline{A}_{NC}$ = missile commanded normal acceleration vector
$\underline{V}$ = missile velocity vector
$\underline{R}$ = position vector of target relative to missile along line-of-sight
$\underline{W}$ = turn rate vector of missile
$\underline{W}_R$ = turn rate vector of $\underline{R}$ = LOS turn rate vector
$A_{TH}$ = longitudinal acceleration of missile produced by motor thrust and missile drag
N = proportional navigation ratio
t = time from launch The vector differential equations 3 through 10 are solved by numerical integration starting with the following initial conditions.

$$P(o) = 0$$

$$V(o) = \begin{bmatrix} V_A \\ 0 \\ 0 \end{bmatrix}$$

$P_T(o)$ is given by equation (1)

Figure 5:
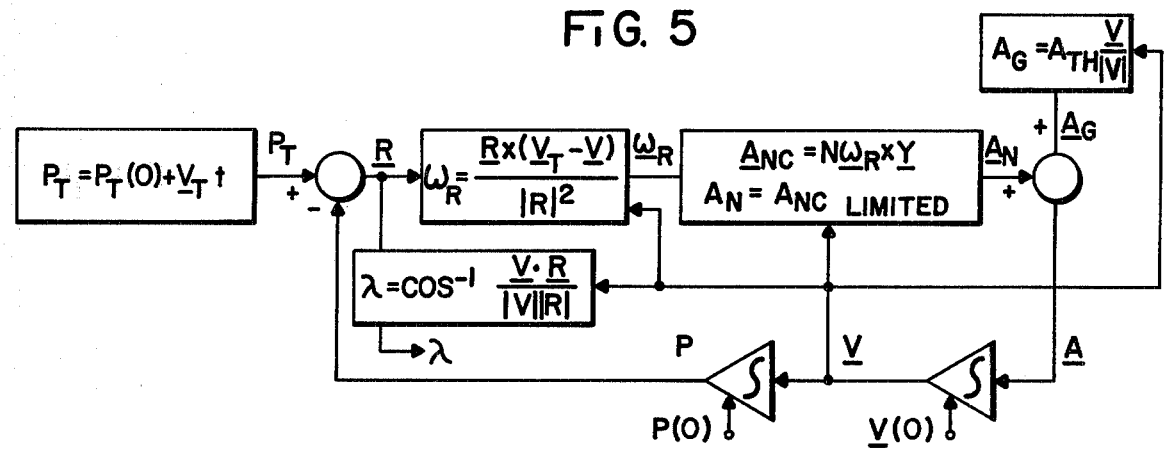
FIG. 5 is a block diagram representation of trajectory computations for the missile.

A block diagram representation of the implementation of the differential equations appears in FIG. 5. Since the blocks of FIG. 5 are well known computations which can be easily performed in standard computers, or microprocessors, or the like, no specific circuitry is illustrated therefor.

Computations of "ready" or "out-of-envelope" are made by calculating the above flight trajectory equations to provide the miss distance and then determining whether the miss distance is satisfactory by determining whether the following conditions are satisfied; first, the range of closest approach of the missile 36 to the target 40, or the miss distance, must be less than a specified value dependent on warhead lethality, that is $$R_{MIN} < D_{MA}$$

where
$R_{MIN}$ = minimum value of $|R|$ = miss distance
$D_{MA}$ = maximum tolerable miss distance.

Second, from launch to the time of closest approach of the missile 36 to the target 40 the missile velocity must be greater than a minimum critical value, that is $$|V| > \underline{V}_A$$

where $\underline{V}_A$ = minimum missile velocity for satisfactory performance. Third, from launch to the seeker blind range, the seeker look angle, λ, must be less than the maximum tolerable angle, that is $$\lambda < \lambda_A$$

where λ = look angle = angle between LOS from seeker to target and missile longitudinal axis $\lambda_A$ = maximum tolerable value of λ

λ is computed from the equation $$\lambda = \cos^{-1}\left[\frac{V \cdot R}{|V||R|}\right]$$

values such as $D_{MA}$, $\underline{V}_A$ and $\lambda_A$ may be calculated in advance and stored in the memory 25. Also, the acceleration limit of the missile, $A_L$, used in the flight trajectory equations may be stored in the memory 25 as well as any other values which may be considered limits or which may be fixed.

Thus, an improved missile launch envelope computation system is described which will significantly reduce the number of missiles launched outside of their capability envelopes. Further, because of the onboard radar, true range, range rate, angle and angular rate are supplied in conjunction with the onboard launch envelope computer. This can greatly reduce the cost of fighters, mobile ground launchers, and other short range air intercept systems where operation without a separate radar is desirable.

While we have shown and described a specific embodiment of this invention, further modifications and improvements will appear to those skilled in the art. We desire it to be understood, therefore, that this invention is not limited to the particular form shown and we intend in the appended claims to cover all modifications which do not depart from the spirit and scope of this invention.

What is claimed is:

1. An active radar missile launch envelope computation system adapted to be mounted on a missile for control thereof comprising:
   (a) a radar including a transmitter and a receiver for providing output signals indicative of the range to a target and the rate of change of the range;
   (b) angle determining means incorporated in said radar for providing output signals indicative of the angular position and angular rate of the target relative to a predetermined axis fixed in relation to the missile and the rate of change of the angular position;
   (c) computation means connected to receive the output signals from said radar and said angle determining means;
   (d) memory means connected to said computation means and including storage means for signals indicative of maximum and minimum capabilities of the missile; and (e) said computation means comparing received output signals to the maximum and minimum capabilities signals stored in said memory means and providing a ready output signal when the comparison lies within the stored capabilities.

2. A system as claimed in claim 1 including in addition second computation means connected to said memory means for altering the signals indicative of maximum and minimum capabilities in accordance with variations in conditional parameters.

3. A system as claimed in claim 2 including in addition input means for receiving the altitude of the missile at launch, said altitude receiving means providing an input to the second computation means as a conditional parameter.

4. A system as claimed in claim 2 including in addition means for receiving the velocity of the missile at launch, said velocity receiving means providing an input to the second computation means as a conditional parameter.

5. A system as claimed in claim 1 wherein the computation means includes a microprocessor.

6. A system as claimed in claim 2 including in addition means for providing to an operator a signal indicative of the correction required to bring a target from a "no launch" condition to a "launch" condition.